(12) United States Patent
Sreehari et al.

(10) Patent No.: US 8,898,728 B2
(45) Date of Patent: Nov. 25, 2014

(54) SYSTEM AND METHOD OF REAL-TIME CHANGE PROPAGATION AND ACTIVATION USING A DISTRIBUTED OBJECT CACHE

(75) Inventors: Narasimhaiah Sreehari, Cupertino, CA (US); Vamsi Motukuru, Monmouth, NJ (US)

(73) Assignee: Oracle International Corporation, Redmond Shores, CA (US)

( * ) Notice: Subject to any disclaimer, the term of this patent is extended or adjusted under 35 U.S.C. 154(b) by 45 days.

(21) Appl. No.: 13/241,825

(22) Filed: Sep. 23, 2011

(65) Prior Publication Data

US 2013/0081100 A1  Mar. 28, 2013

(51) Int. Cl.
*G06F 15/16*  (2006.01)
*G06F 21/00*  (2013.01)

(52) U.S. Cl.
CPC ................ *G06F 15/16* (2013.01); *G06F 21/00* (2013.01)
USPC .......................................................... 726/1

(58) Field of Classification Search
CPC ...................................................... G06F 21/00
USPC ............................................................. 726/1
See application file for complete search history.

(56) References Cited

U.S. PATENT DOCUMENTS

| | | | |
|---|---|---|---|
| 6,772,214 B1* | 8/2004 | McClain et al. | 709/229 |
| 8,195,610 B1* | 6/2012 | Traband et al. | 707/638 |
| 2002/0038301 A1* | 3/2002 | Aridor et al. | 707/10 |
| 2006/0080546 A1* | 4/2006 | Brannon et al. | 713/185 |
| 2008/0209505 A1* | 8/2008 | Ghai et al. | 726/1 |
| 2009/0182945 A1* | 7/2009 | Aviles et al. | 711/122 |
| 2010/0162383 A1* | 6/2010 | Linden et al. | 726/13 |
| 2010/0325357 A1* | 12/2010 | Reddy et al. | 711/118 |
| 2011/0016090 A1* | 1/2011 | Krishnaprasad et al. | 707/648 |
| 2011/0088043 A1* | 4/2011 | Lind et al. | 719/316 |
| 2011/0107078 A1* | 5/2011 | Resch et al. | 713/150 |
| 2012/0005431 A1* | 1/2012 | Gross et al. | 711/130 |
| 2012/0011398 A1* | 1/2012 | Eckhardt et al. | 714/15 |

* cited by examiner

*Primary Examiner* — Techane Gergiso
(74) *Attorney, Agent, or Firm* — Kilpatrick Townsend & Stockton LLP (57) ABSTRACT

Embodiments of the invention provide systems and methods for using a distributed object cache to propagate and activate changes to security information across nodes of a cluster. Embodiments of the present invention can be implemented, for example, in a security product that enforces security policies, i.e., access control, etc., on resources such as web content provided by a set of servers of nodes of a computing grid and provide ways to handle data synchronization between the servers or nodes of the grid. This synchronization can be performed using a distributed object cache that provides replicated and distributed object caching services. For example, Oracle Coherence is one such distributed object cache that is built on top of a reliable, highly scalable peer-to-peer clustering protocol. However, embodiment of the present invention are not limited to use with Coherence but rather are equally applicable to other distributed object caches.

19 Claims, 7 Drawing Sheets

SYSTEM AND METHOD OF REAL-TIME CHANGE PROPAGATION AND ACTIVATION USING A DISTRIBUTED OBJECT CACHE

BACKGROUND OF THE INVENTION

Embodiments of the present invention relate generally to methods and systems for propagating information across systems and more particularly to using a distributed object cache to propagate and activate changes to security information across nodes of a cluster.

Access management systems enforce access to protected resources and the enforcement action is dependent on different types of information (identity, policy, partner, transient, session and configuration). For example, an access management system may be implemented on a grid or cluster of servers and can control access to the various resources of those servers. When a change is made to an access artifact (e.g. policy change, partner addition/deletion), it is imperative that the change be activated to all the access management server instances in the cluster in real-time in order to avoid the potential for security vulnerabilities that result from delayed activation. In addition, the security sensitivity of the access artifacts requires the information to be restricted to the servers hosting the access management applications.

Previous approaches to propagating such changes relied on synchronization of the security information through a database or other external physical repository in which the security information was stored and which was periodically polled by the different instances of the access management server. However, since this approach relies on a polling interval of each instance of the access management server, this approach is slow and the various instances are not synchronized at the same time. Therefore, the changes are not guaranteed to be propagated within that polling period, i.e., until that period has elapsed. Also, reliance on a database or other repository to propagate the information to all of the different server instances provides a single point of failure.

Another technique that has also been used is for the physical repository to provide notifications of changes. This requires additional notification infrastructure which adds to the complexity while the physical repository is still a single point of failure. In addition, the changes still requires two steps, i.e., update the physical repository followed by a notification. Hence, there is a need for improved methods and systems for propagating information, such as security information, across systems, such as across nodes of a cluster.

BRIEF SUMMARY OF THE INVENTION

Embodiments of the invention provide systems and methods for using a distributed object cache to propagate and activate changes to security information across nodes of a cluster. According to one embodiment, a method for propagating security information to a plurality of nodes in a cluster can comprise receiving the security information at a first node of the plurality of nodes in the cluster. For example, the cluster comprises an Oracle Coherence grid. The security information can comprise administrative data including one or more sets of security policies and security configuration data. Such security configuration data can include lists of clients and corresponding keys. Additionally or alternatively, the security information can comprise runtime data including session information for one or more client sessions. Such session information can comprise session contents for each of the one or more client sessions.

The security information can be stored locally in the first node. Additionally, the security information can be stored by the first node on a distributed object cache of the cluster. Storing the security information on the distributed object cache can comprise writing the security information to a Application Program Interface (API), the API comprising a map abstraction of nodes of the distributed object cache. Additionally, storing the security information on the distributed object cache can comprise writing the security information to a journal, the journal comprising a plurality of log entries, each log entry comprising information identifying changes made to the security information and a time of the changes.

The security information can be distributed from the distributed object cache to at least one second node of the plurality of nodes in the cluster. Distributing the security information from the distributed object cache can comprise providing a notification from at least one of the journal or the API to the at least one second node of the plurality of nodes and updating locally stored security information on the at least one second node of the plurality of nodes with the security information from the distributed object cache based on the log entries of the journal and a type of the security information. For example, when the type of the security information comprises security policy data, updating locally stored security information on the at least one second node of the plurality of nodes with the security information from the distributed object cache can comprise replacing the locally stored security information with updated security information from a database on the distributed object cache in response to determining based on the log entries of the journal that the updated security information from the database is newer than the locally stored security information. In another example, when the type of the security information comprises other than security policy data, updating locally stored security information on the at least one second node of the plurality of nodes with the security information from the distributed object cache can comprise replacing the locally stored security information with updated security information from the API in response to determining based on the log entries of the journal that the updated security information from the API is newer than the locally stored security information.

According to another embodiment, a system can comprise a first computing node of a plurality of computing nodes in a cluster. The first computing node can receive security information, store the security information locally in the first node, store the security information on a distributed object cache of the cluster, and distribute the security information from the distributed object cache. Storing the security information on the distributed object cache can comprise writing the security information to a Application Program Interface (API) comprising a map abstraction of nodes of the distributed object cache. Storing the security information on the distributed object cache can also comprise writing the security information to a journal comprising a plurality of log entries, each log entry comprising information identifying changes made to the security information and a time of the changes. Distributing the security information from the distributed object cache can comprise providing a notification from at least one of the journal or the API to the second computing node.

The system can further comprise a second computing node of the plurality of computing nodes in the cluster. The second computing node can maintain locally stored security information. Distributing the security information from the distributed object cache can comprise updating the locally stored security information on the second computing node with the security information from the distributed object cache based on the log entries of the journal and a type of the security information. For example, when the type of the security information comprises security policy data, updating locally stored security information on the second computing node with the security information from the distributed object cache can comprise replacing the locally stored security information with updated security information from a database on the distributed object cache in response to determining based on the log entries of the journal that the updated security information from the database is newer than the locally stored security information. When the type of the security information comprises other than security policy data, updating locally stored security information on the second computing node with the security information from the distributed object cache can comprise replacing the locally stored security information with updated security information from the API in response to determining based on the log entries of the journal that the updated security information from the API is newer than the locally stored security information.

DETAILED DESCRIPTION OF THE INVENTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for propagating information, such as security information, across systems, such as across nodes of a cluster. More specifically, embodiments of the present invention provide for using a distributed object cache to propagate and activate changes to security information across nodes of a cluster. Embodiments of the present invention can be implemented, for example, in a security product that enforces security policies, i.e., access control, etc., on resources such as web content provided by a set of servers of nodes of a computing grid and provide ways to handle data synchronization between the servers or nodes of the grid. This synchronization can be performed using a distributed object cache that provides replicated and distributed object caching services. For example, Oracle Coherence is one such distributed object cache that is built on top of a reliable, highly scalable peer-to-peer clustering protocol. However, embodiment of the present invention are not limited to use with Coherence but rather are equally applicable to other distributed object caches.

According to one embodiment, an interface, referred to herein as the MapStore, can be built on top of the distributed object cache for access management artifact distribution and activation. By way of example but not limitation, this interface can provide a java.util.Map that is used by the access management application at runtime to access artifacts, which are mapped to the distributed object cached objects. This decouples the runtime code from the persistence store thereby facilitating flexible deployments. Such an embodiment can be used in access management products to provide a highly available, performant and scalable access management solution, by leveraging the replication and distributed data caching services of a distributed object cache without requiring a database of other external repository. This allows access management products to be compact and lightweight without compromising high availability and scalability characteristics. Various additional details of embodiments of the present invention will be described below with reference to the figures.

Figure 1:
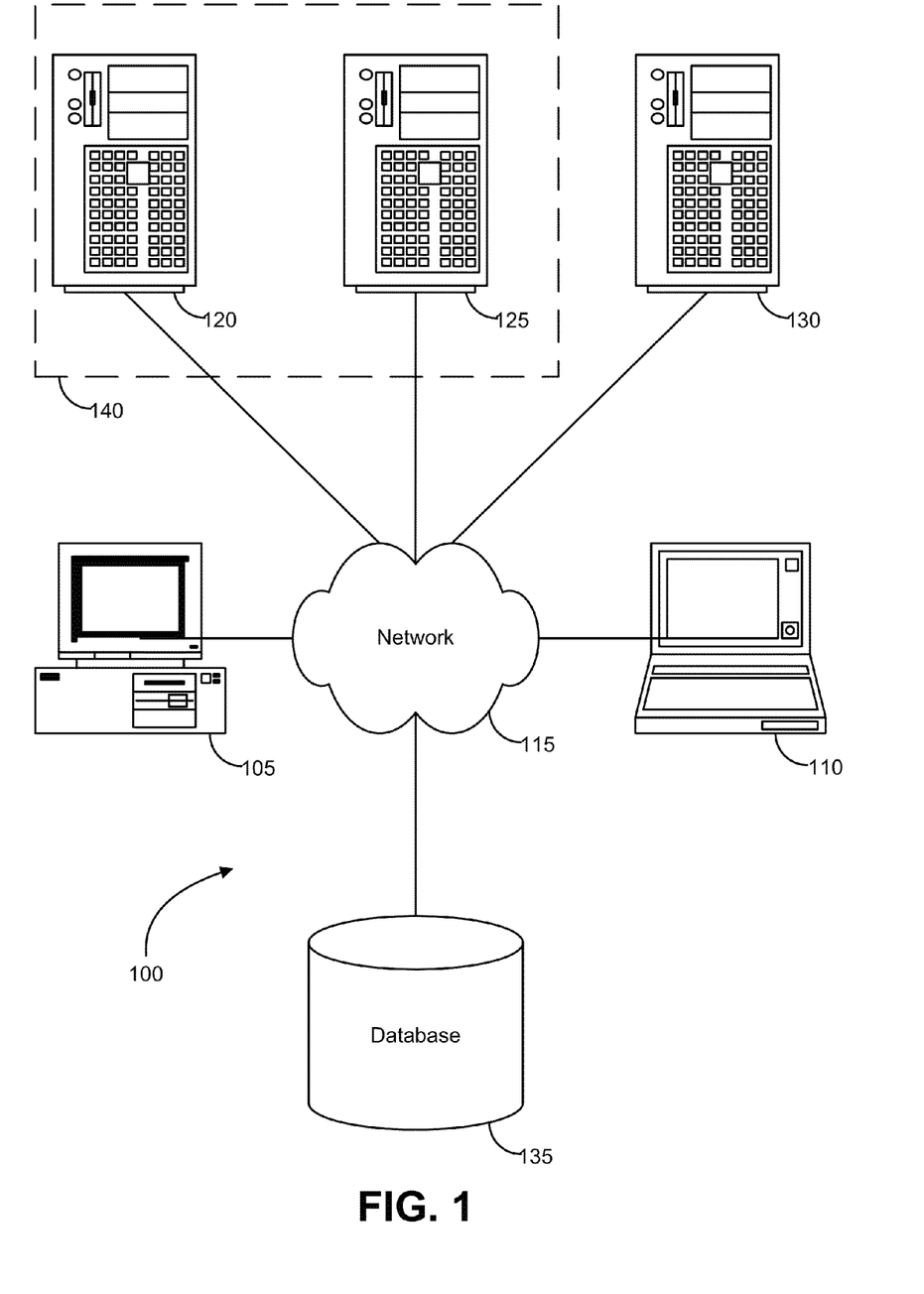
FIG. 1 is a block diagram illustrating components of an exemplary operating environment in which various embodiments of the present invention may be implemented.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
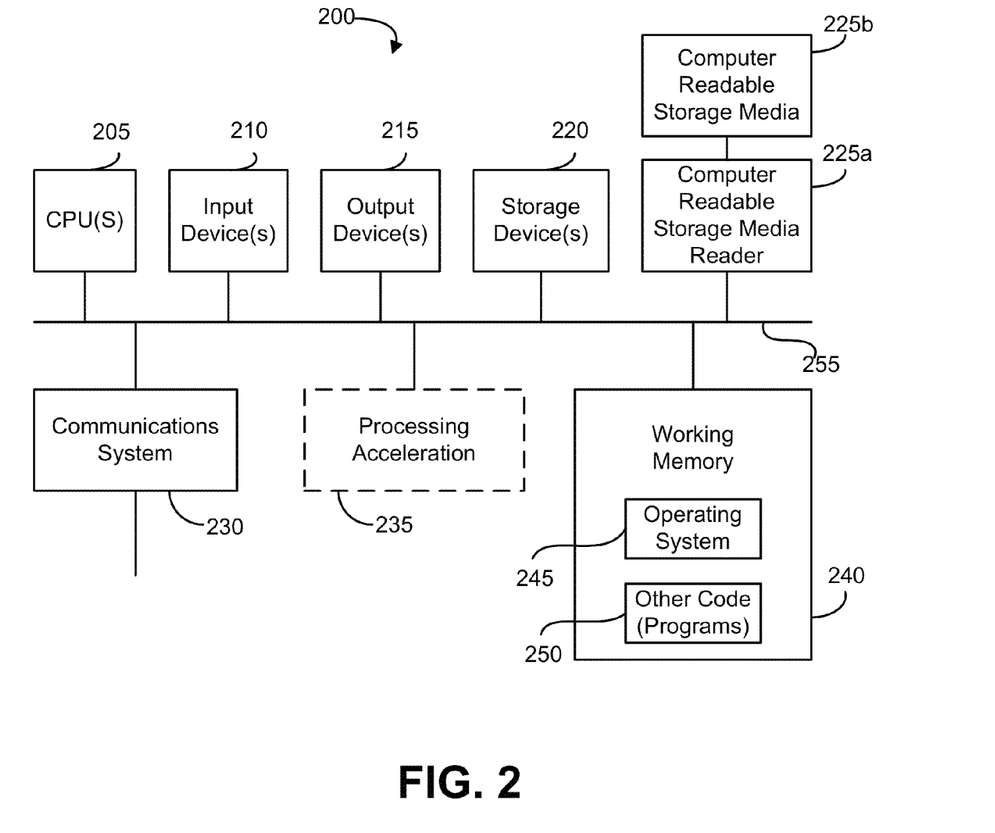
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Figure 3:
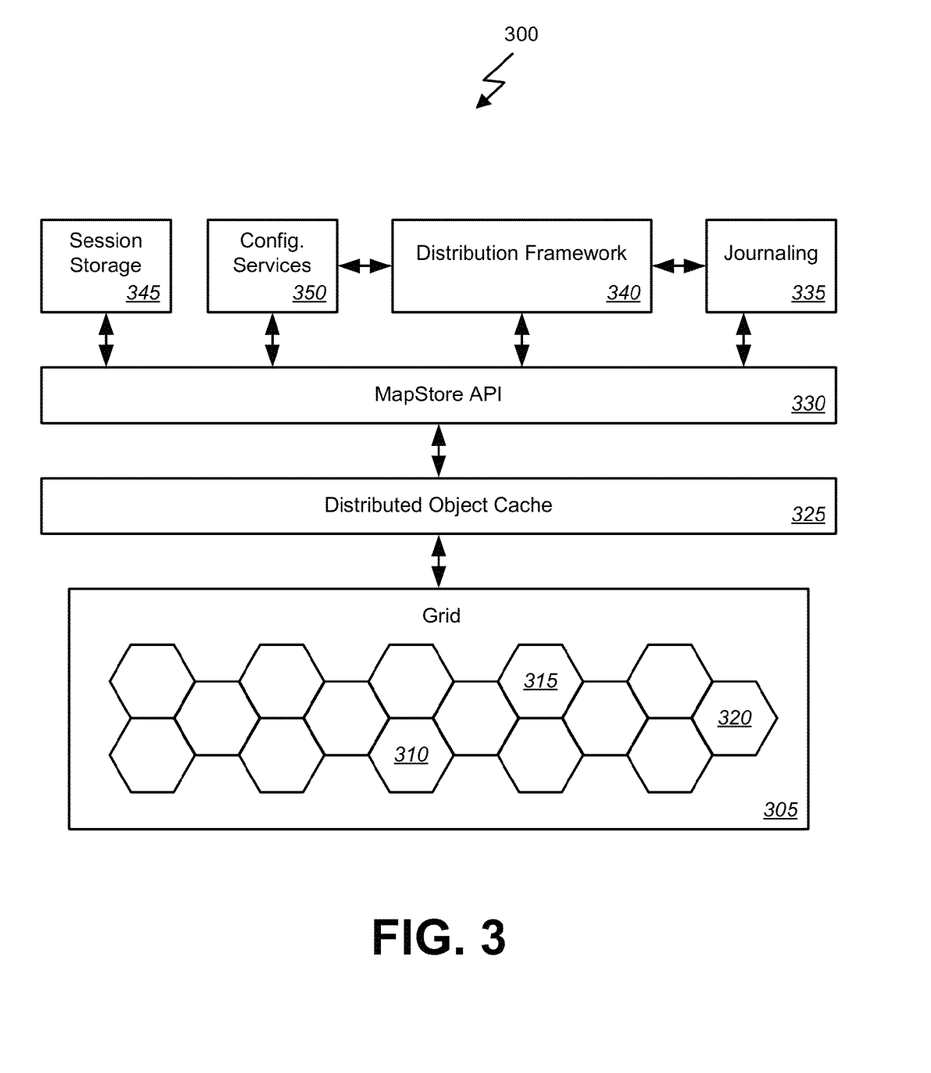
FIG. 3 is a block diagram illustrating, at a high-level, functional components of a system for a distributed object cache to propagate and activate changes to security information across nodes of a cluster according to one embodiment of the present invention.

FIG. 3 is a block diagram illustrating, at a high-level, functional components of a system for a distributed object cache to propagate and activate changes to security information across nodes of a cluster according to one embodiment of the present invention. In this example, the system 300 includes computing grid 305 or cluster consisting of a number of nodes 310, 315, and 320. The system 300 also includes a distributed object cache 325 that provides replicated and distributed object caching services for the nodes 310, 315, and 320 of the grid 305. For example, Oracle Coherence is one such distributed object cache 305 that is built on top of a reliable, highly scalable peer-to-peer clustering protocol and that provides synchronization and propagation of runtime data across the nodes 310, 315, and 320 of the grid 305. However, embodiment of the present invention are not limited to use with Coherence but rather are equally applicable to other distributed object caches.

Generally speaking, embodiments of the present invention are directed to storing security policies and metadata on the distributed object cache 325 and using the distributed object cache 325 to propagate that information across the nodes 310, 315, and 320 of the grid 305. According to one embodiment, the system 300 can also include a MapStore 330 implemented on the distributed object cache 325 and computing grid 305. Generally speaking, the MapStore 330 can comprise an interface, such as an Application Program Interface (API) that provides a core abstraction over the distributed object cache 325. More specifically, the MapStore API 330 presents a map abstraction of the distributed object cache 325 that can be used by nodes 310, 315, and 320 of the grid 305 to write objects to the distributed object cache 325. Once written into the distributed object cache through the MapStore API 330, this information can be replicated across the grid 305. The types of data that can be replicated in this way can include, for example, administrative data and runtime data. Generally speaking, administrative data can comprise sets of security policies and/or security configuration information such as lists of clients and keys for the security information. Runtime data can comprise, for example, user session information.

The system 300 can also include distribution framework 340 layered on top of the MapStore 330. The distribution framework 340 works off of a map location from the MapStore API 330 that is versioned and provides ordinal versioning of data used to distribute security objects. Session storage 345 can also be implemented on the MapStore API 330. The session storage 345 can store information for individual user sessions and make use of map locations of the MapStore API 330 that are independently keyed to the sessions and that is unique for each store that is done. The distribution framework 340 can do distribution based on a name space allocated to each client but data stored on the distributed object cache 325 through the MapStore API 330 can be specific to the location of the client. Generally speaking the distribution framework 340 provides on top of the MapStore API 330 a notification framework through which a node 310 with information to distribute can send notification to listeners of the distribution, i.e., other nodes 315 and 320 of the grid 305

A journaling mechanism 335 can also access the MapStore API 330 and the distribution framework 340. The journaling mechanism 335 can also support notification to listeners, i.e., nodes 310, 315, and 320 of the grid 305, through its own notification framework. The journaling mechanism 335 can write log entries of changes indicating what chances applied to which information and when the changes are applied. These journal entries can be written out first, before making an update, so that if a change is not completed, for example, a node 310 initiating the change fails or stops before the change is completed, that change can be completed when the node 310 rejoins the grid 305.

The system can also include a configuration services module 350 layered on the MapStore API 330 and distribution framework 340. Generally speaking, administration of the MapStore API can be performed through administration pages generated by the configuration services module 350 and displayed on a console. The configurations generated and/or modified through such pages can be stored by the configuration services module 350 in a configuration map (not shown here). The elements stored by the configuration services module 350 can contain the class definitions and other elements or attributes for implementation of the MapStore API 330 and distribution framework 340.

In this system 300 and according to one embodiment, a process for propagating a change of security information can depend on the type of information being updated. As noted above, the types of security information that can be replicated can include, for example, administrative data and runtime data. Administrative data can comprise sets of security policies and/or security configuration information such as lists of clients and keys for the security information. In the case of configuration data, the data can be made available in the MapStore 330. First, a server or node 310 in grid 305 reads a file and saves it in the distributed object cache 325 through the MapStore API 330. As other server nodes 315 and 320 come up and/or join the cluster, they read the distributed object cache 325 with this data. If those nodes have an older version of the distributed data object, they can replace it with the version from the distributed object cache 325 and back it up locally. In the case of policy data, two different approaches can be used. In one approach, the policy set can be treated like configuration data. That is, the policy set can be stored in a file and distributed on the distributed object cache 325 through the MapStore API 330 in same way as configuration data. In another case, if the policy set resides in database or externally, instead of sending a copy of the policy to other nodes through the distributed object cache 325 when a change is made to the policy, a journal entry can be written through the MapStore API 330 and the journaling mechanism 335. The journal entry can show what information/policies changed and can be used for polling, i.e., the listening nodes of the grid can poll the database based on the journal entry and notification received from the journaling mechanism.

Stated another way, updating security information is the system 300 can begin receiving new or updated security information at a first node 310 of cluster or grid 305. The security information can be written in a journal entry by the first node 310 through the MapStore API 330 and journaling mechanism and stored locally in the first node 310. The security information can also be stored or written to the distributed object cache 325 by the first node 310 though the interface provided by the MapStore API 330. The distributed object cache 325 can receive the security information from the first node 310 and can distribute the security information to other nodes 315 and 320 of the cluster or grid 305. Distributing the security information from the distributed object cache 325 can comprise providing a notification from at least one of the journaling mechanism 335 or the MapStore 330 to the other nodes 315 and 320. That is a notification can be sent to subscribing or listening nodes 315 and 320.

The other nodes 315 and 320 can receive the notification from the distributed object cache 325 and/or journaling mechanism 335 and determine whether to update local security information based on that received by the distributed object cache 325 or indicated in the journal. The determination as to whether to update the local security information of another node 315 can be based on the log entries of the journal and a type of the security information. So for example, the security information can comprise security policy data. In such a case, updating locally stored security information on the other node 315 with the security information from the distributed object cache 325 can comprise replacing the locally stored security information with updated security information from the distributed object cache in response to determining, based on the log entries of the journal that the updated security information is newer than the locally stored security information. In another example, the type of the security information comprises other than security policy data, such as configuration data. In such cases, updating locally stored security information on the other node 315 with the security information from the distributed object cache 325 can comprise replacing the locally stored security information with updated security information from the MapStore API 330 in response to determining based on the log entries of the journal that the updated security information from the MapStore API 330 is newer than the locally stored security information.

Figure 4:
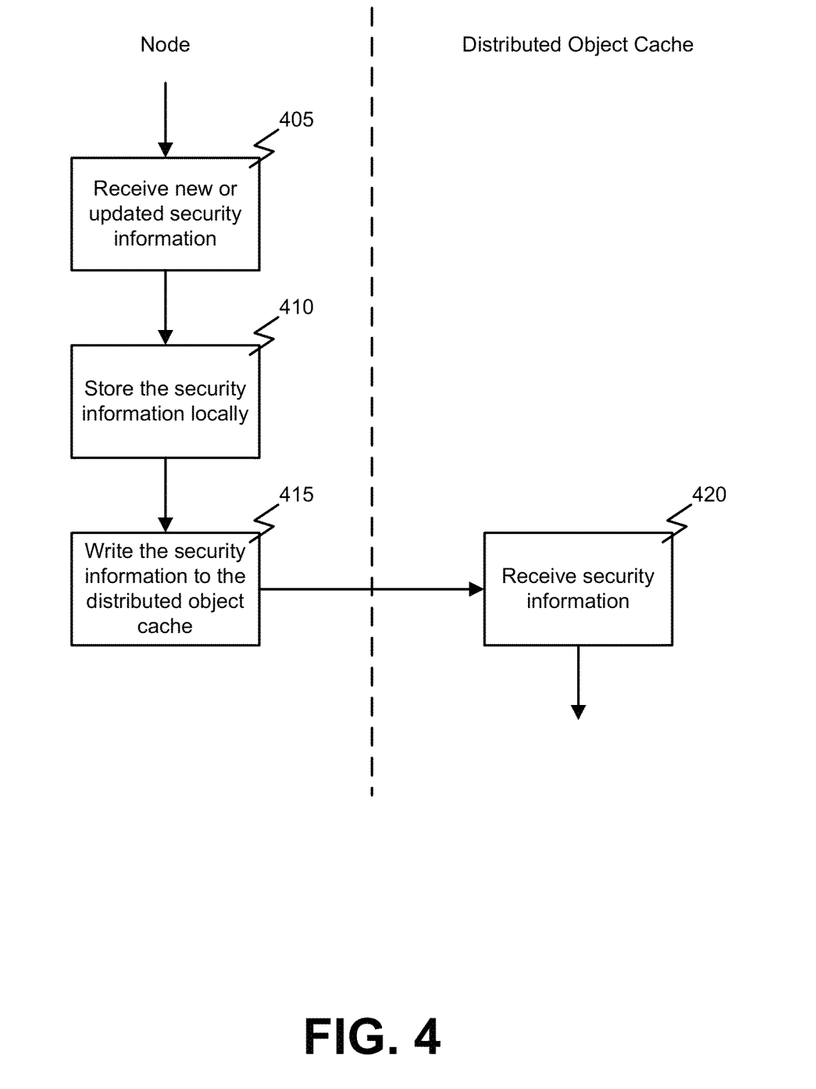
FIG. 4 is a flowchart illustrating a process for propagating and activating changes to security information across nodes of a cluster according to one embodiment of the present invention.

FIG. 4 is a flowchart illustrating a process for propagating and activating changes to security information across nodes of a cluster according to one embodiment of the present invention. In this example, the process begins with receiving 405 new or updated security information at a first node of the plurality of nodes in the cluster. The security information can be stored 410 locally in the first node. The security information can also be stored or written 415 to the distributed object cache of the cluster by the first node. As noted above, the security information can comprise administrative data. In such cases, the administrative data can include one or more sets of security policies and security configuration data such as lists of clients and corresponding keys. Additionally or alternatively, the security information can comprise runtime data. In such cases, the runtime data can include session information for one or more client sessions. For example, the session information can comprise session contents for each of the one or more client sessions.

Regardless of the exact content of the security information, storing or writing 415 the security information on the distributed object cache can comprise writing the security information to a MapStore comprising an API representing a map abstraction of nodes of the distributed object cache. Additionally, storing or writing the security information on the distributed object cache can comprise writing the security information to a journal. The journal can comprise a plurality of log entries, each log entry comprising information identifying changes made to the security information and a time of the changes. The distributed object cache can receive 420 the security information from the first node of the cluster.

Figure 5:
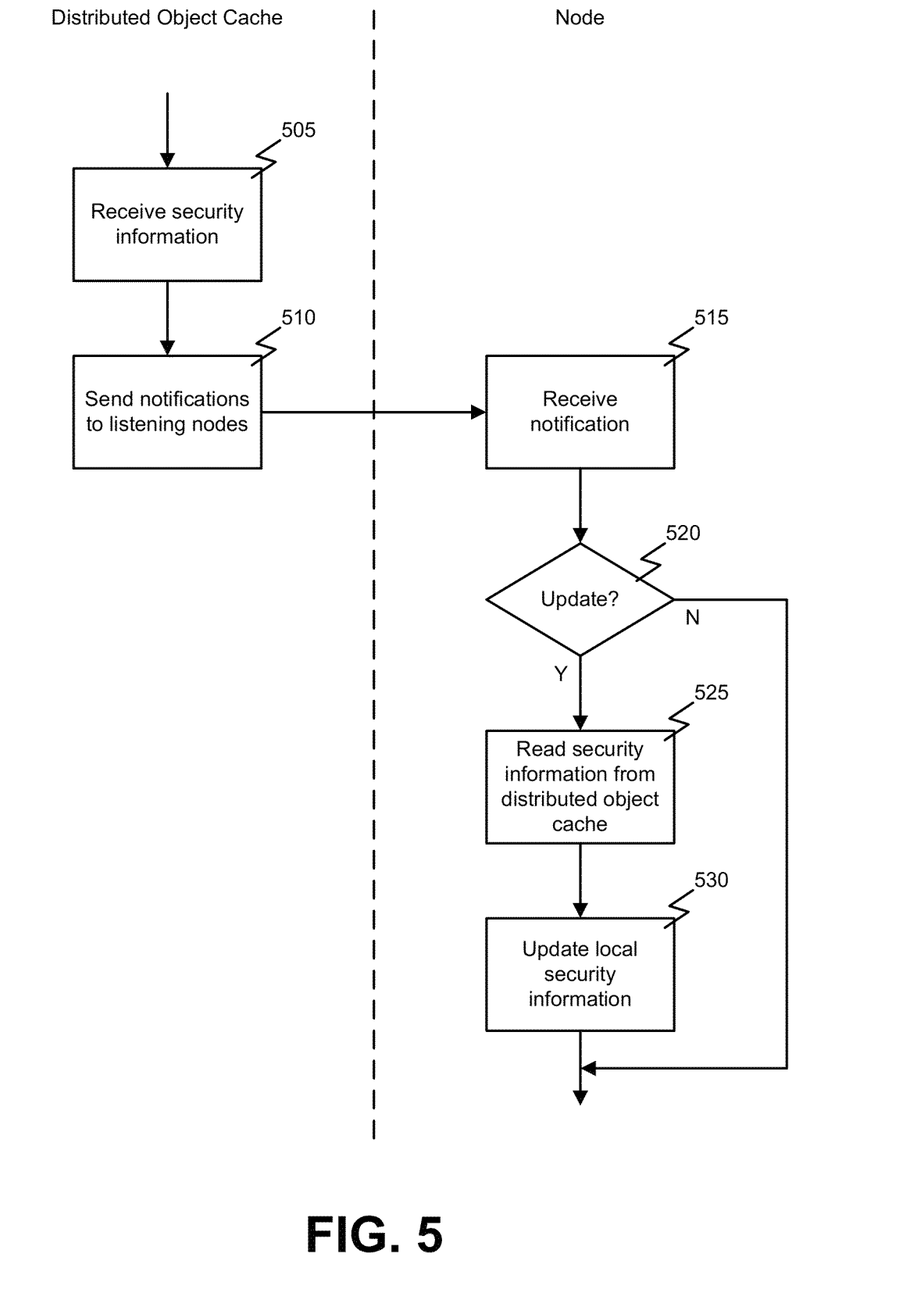
FIG. 5 is a flowchart illustrating additional details of a process for propagating and activating changes to security information across nodes of a cluster according to one embodiment of the present invention.

FIG. 5 is a flowchart illustrating additional details of a process for propagating and activating changes to security information across nodes of a cluster according to one embodiment of the present invention. As noted above, the distributed object cache can receive 505 the security information from the first node, i.e., through the MapStore API, and distribute the security information to one or more other nodes. Distributing the security information from the distributed object cache can comprise providing 510 a notification from at least one of the journal or the MapStore to the at least one second node of the plurality of nodes. That is a notification can be sent to subscribing or listening nodes of the cluster.

A second node of the cluster can receive 515 the notification from the distribute cache and determine 520 whether to update local security information based on that received by the distributed object cache. In response to determining 520 that local security information should be updated, the second node can read 525 or request the security information from the distributed object cache and update 530 locally stored security information based on that read 525 or received from the distributed object cache.

The determination 520 as to whether to update the local security information of the second node can be based on the log entries of the journal and a type of the security information. So for example, the security information can comprise security policy data. In such a case, updating 530 locally stored security information on the at least one second node of the plurality of nodes with the security information from the distributed object cache can comprise replacing the locally stored security information with updated security information from a database on the distributed object cache in response to determining 520 based on the log entries of the journal that the updated security information from the database is newer than the locally stored security information. In another example, the type of the security information comprises other than security policy data, such as configuration data. In such cases, updating 530 locally stored security information on the at least one second node of the plurality of nodes with the security information from the distributed object cache can comprise replacing the locally stored security information with updated security information from the MapStore API in response to determining 520 based on the log entries of the journal that the updated security information from the MapStore is newer than the locally stored security information.

Figure 6:
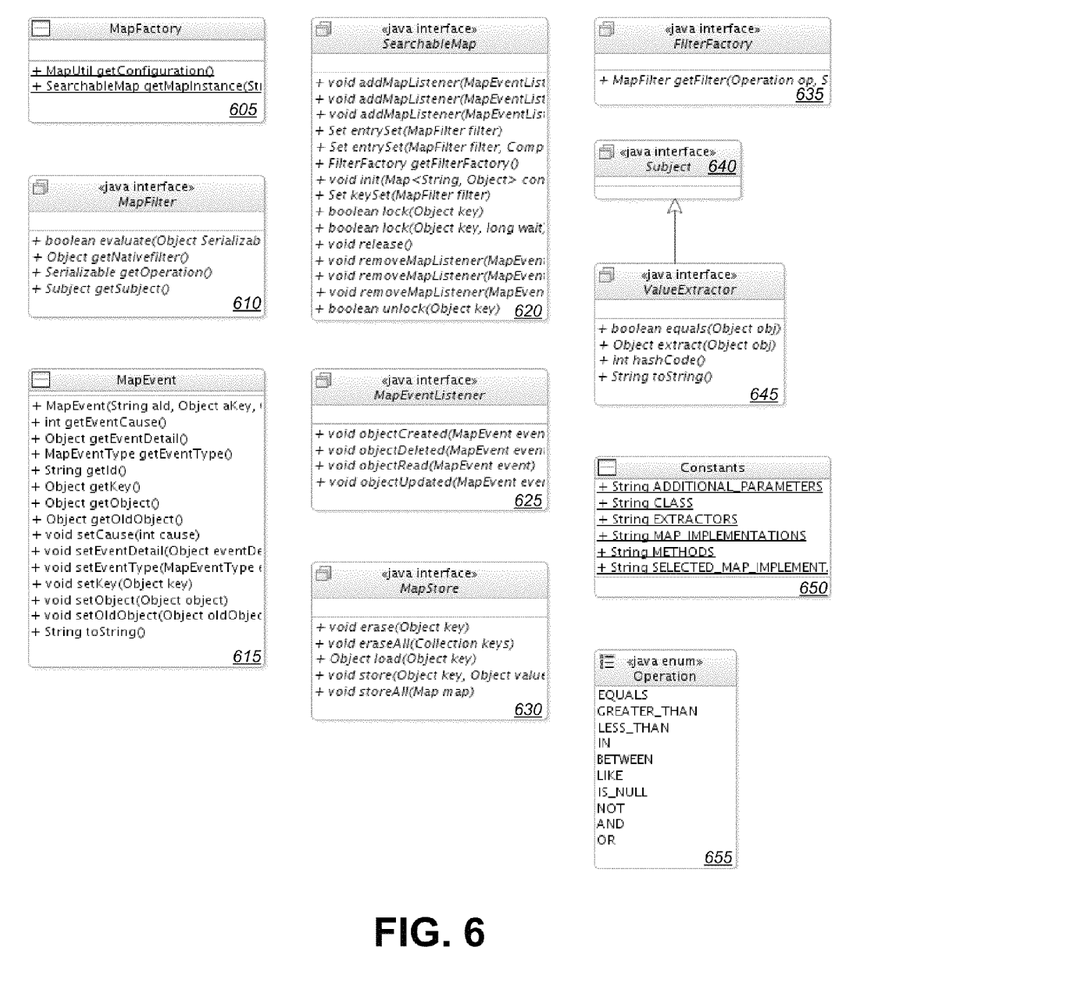
FIG. 6 is a block diagram illustrating a set of exemplary classes for a MapStore Application Program Interface (API) according to one embodiment of the present invention.

FIG. 6 is a block diagram illustrating a set of exemplary classes for a MapStore Application Program Interface (API) according to one embodiment of the present invention. According to this example, a SearchableMap 620 interface can define the MapStore API. A MapFactory 605 object can produce instances of SearchableMap 620 based on the configuration settings and the parameters passed to the factory. A SearchableMap 620 object can implement the java.util.Map interface. Create Read Update Delete (CRUD) operations on the object stored in the map can be achieved through this interface.

Clients wishing to listen to object change notifications can implement a MapEventListener 625 interface. The registration for events can be for all events, for events of a specific key, or for a filter provided during registration. On notification, listeners can get a MapEvent 615 object. This object will contain the details of the object that triggered the event.

Filter objects can be used to filter objects in the MapStore. This may be used to query for objects that satisfy a given condition. FilterFactory 635 implementations produce a Filter object. Filter objects can be implementation specific and can implement a MapFilter 610 interface. Different filter objects may exist for different operations. Implementations may support filter objects for all or some of the operations specified in the Operation 655 enumeration. A filter object can be evaluated for objects that satisfy a clause. The subject of the clause can be an implementation of Subject 640 interface. A ValueExtractor 645 is a specific type of a Subject 640 that can extract an attribute from the objects passed to it. A filter object may perform an evaluation Operation 655 on the value extracted by the ValueExtractor 645.

Some of the MapStore API may persist data into a persistent store. A MapStore 630 Interface can provide for implementations to be consistent across implementations. As used herein, the term constraint refers to a rule that is applied to grant or deny access to a particular resource based on the context of the request for that resource. For example, it can be used during access control (authorization) processing to define the obligations (requirements) that must be fulfilled before responding to a client's access request.

Figure 7:
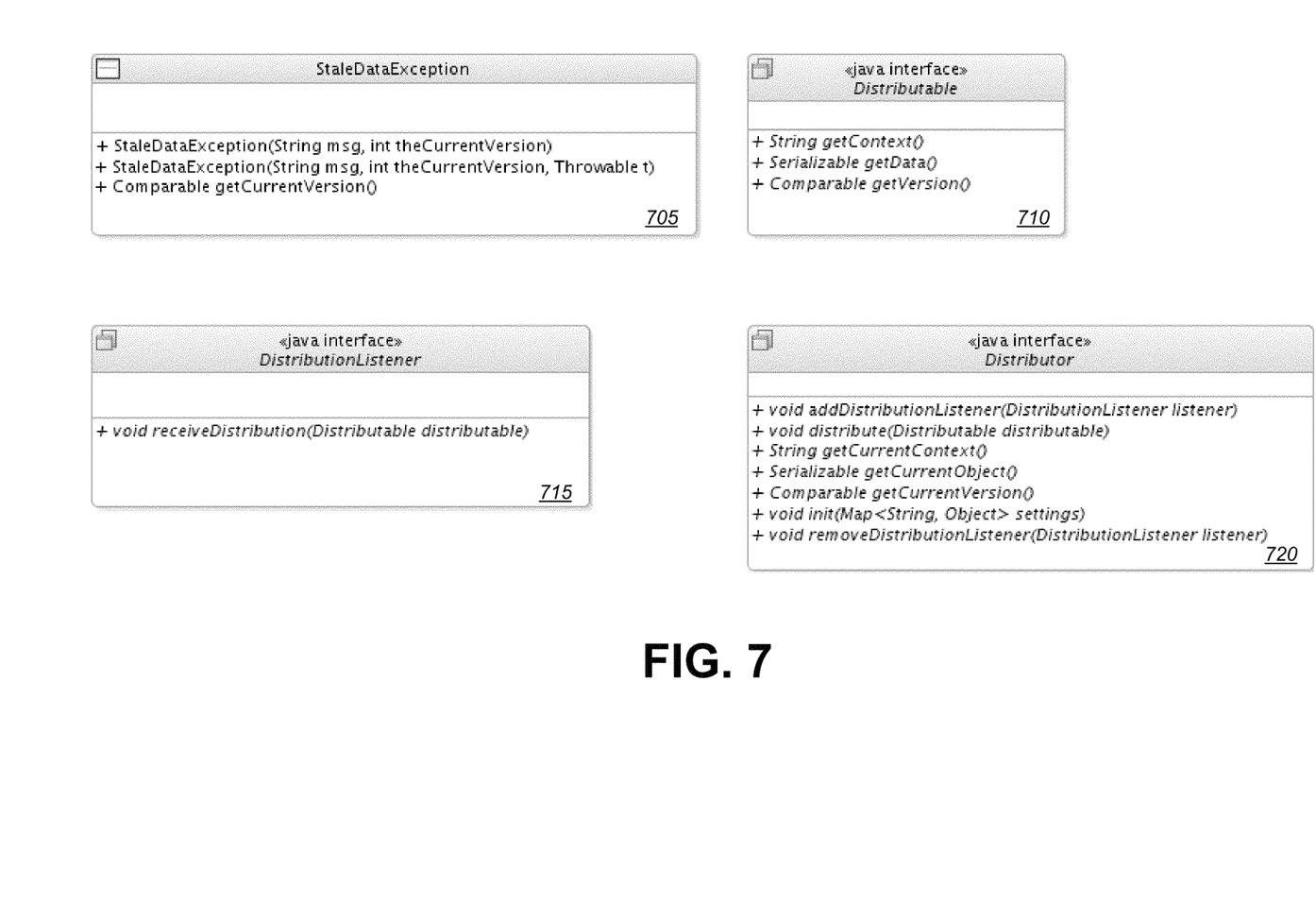
FIG. 7 is a block diagram illustrating a set of exemplary classes for a distribution framework Application Program Interface (API) according to one embodiment of the present invention.

FIG. 7 is a block diagram illustrating a set of exemplary classes for a distribution framework Application Program Interface (API) according to one embodiment of the present invention. Generally speaking a distribution framework API as shown here can provide a versioned, security object distribution abstraction on top of the Mapstore API described above. A Distributor 720 can enable distribution of security objects across nodes in a version consistent manner. While the distribution mechanism may be asynchronous, the nodes can contain versioned security objects, i.e., that are not overwritten by previous versions.

In use, security clients can share objects across nodes by implementing the Distributable 710 interface. This interface 710 exposes the data to be shared as a serializable object. The version of the object can be exposed as a Comparable object. The context of the object can be specific to the client and may be any relevant information that the client may wish to publish. For example, clients can publish information of the publishing node as the context. Clients making use of the Distributor 720 need not worry about the semantics of using the Mapstore API. Each client can register a namespace where the security object distribution shall happen.

Clients wishing to distribute objects can do so through the Distributor 720 using the distribute method. If the distribution is valid, interested parties of this distribution can be notified. A distribution can be considered valid if the object being distributed is a later version than what has already been distributed.

The Distributor 720 can provide a uniform mechanism of object distribution that provides consistency and avoids race conditions during object distribution. The Distributor 720 can help ensure that the object being distributed is later than any object that has already been distributed. If an attempt is made by clients to distribute a stale object (an object that is older than an already distributed object), StaleDataException 705 can be thrown. Consistency may be enforced using a distributed lock.

The Distributor 720 can register DistributionListeners 715 that are interested in distributions. These listeners can register to listen to distributions on specific namespaces. Listeners on the nodes can be notified on any successful object distribution. The notification object can contain references to the Distributable 710 that triggered the distribution.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for propagating security information to a plurality of nodes in a cluster, the method comprising:
receiving the security information at a first node of the plurality of nodes in the cluster, the security information comprising one or more sets of security policies and other information used by each node of the cluster to control of access to resources of the cluster and wherein the security information is received in response to a change in the security information;
storing the security information locally in the first node;
storing by the first node the security information including the one or more sets of security policies as an object on a distributed object cache of the cluster by writing the security information to an Application Program Interface (API), the API comprising a map abstraction of nodes of the distributed object cache;
distributing the object storing the security information including the one or more sets of security policies from the distributed object cache to at least one second node of the plurality of nodes in the cluster; and
updating locally stored security information including one or more sets of security policies on the at least one second node of the plurality of nodes with the security information from the distributed object cache.

2. The method of claim 1, wherein the security information comprises administrative data, the administrative data including security configuration data.

3. The method of claim 2, wherein the security configuration data includes lists of clients and corresponding keys.

4. The method of claim 2, wherein the security information further comprises runtime data, the runtime data including session information for one or more client sessions.

5. The method of claim 4, wherein the session information comprises session contents for each of the one or more client sessions.

6. The method of claim 1, wherein the cluster comprises an Oracle Coherence grid.

7. The method of claim 1, wherein storing the security information on the distributed object cache comprises writing the security information to a journal, the journal comprising a plurality of log entries, each log entry comprising information identifying changes made to the security information and a time of the changes.

8. The method of claim 7, wherein distributing the security information from the distributed object cache comprises providing a notification from at least one of the journal or the API to the at least one second node of the plurality of nodes.

9. The method of claim 8, wherein updating locally stored security information on the at least one second node of the plurality of nodes with the security information from the distributed object cache is based on the log entries of the journal and a type of the security information.

10. The method of claim 9, wherein the type of the security information comprises security policy data and wherein updating locally stored security information on the at least one second node of the plurality of nodes with the security information from the distributed object cache comprises replacing the locally stored security information with updated security information from a database on the distributed object cache in response to determining based on the log entries of the journal that the updated security information from the database is newer than the locally stored security information.

11. The method of claim 9, wherein the type of the security information comprises other than security policy data and wherein updating locally stored security information on the at least one second node of the plurality of nodes with the security information from the distributed object cache comprises replacing the locally stored security information with updated security information from the API in response to determining based on the log entries of the journal that the updated security information from the API is newer than the locally stored security information.

12. A system comprising:
a first computing node of a plurality of computing nodes in a cluster, the first computing node receiving security information, the security information comprising one or more sets of security policies and other information used by each node of the cluster to control of access to resources of the cluster and wherein the security information is received in response to a change in the security information, storing the security information locally in the first node, storing the security information including the one or more sets of security policies as an object on a distributed object cache of the cluster, and distributing the object storing the security information from the distributed object cache, wherein storing the security information on the distributed object cache comprises writing the security information to a Application Program Interface (API), the API comprising a map abstraction of nodes of the distributed object cache, wherein storing the security information on the distributed object cache comprises writing the security information to a journal, the journal comprising a plurality of log entries, each log entry comprising information identifying changes made to the security information and a time of the changes, wherein distributing the security information including the one or more sets of security policies from the distributed object cache comprises providing a notification from at least one of the journal or the API to the second computing node; and a second computing node of the plurality of computing nodes in the cluster, the second computing node maintaining locally stored security information including one or more security policies, wherein distributing the security information from the distributed object cache comprises updating the locally stored security information including the locally stored one or more security policies on the second computing node with the security information from the object storing the security information from distributed object cache based on the log entries of the journal and a type of the security information.

13. The system of claim 12, wherein updating locally stored security information on the second computing node with the security information from the distributed object cache comprises replacing the locally stored security information with updated security information from a database on the distributed object cache in response to determining based on the log entries of the journal that the updated security information from the database is newer than the locally stored security information.

14. The system of claim 12, wherein updating locally stored security information on the second computing node with the security information from the distributed object cache comprises replacing the locally stored security information with updated security information from the API in response to determining based on the log entries of the journal that the updated security information from the API is newer than the locally stored security information.

15. A computer-readable device comprising a set of instructions stored thereon which, when executed by a processor, cause the processor to propagate security information to a plurality of nodes in a cluster by:
receiving the security information at a first node of the plurality of nodes in the cluster, the security information comprising one or more sets of security policies and other information used by each node of the cluster to control of access to resources of the cluster and wherein the security information is received in response to a change in the security information;
storing the security information locally in the first node;
storing by the first node the security information including the one or more sets of security policies as an object on a distributed object cache of the cluster by writing the security information to an Application Program Interface (API), the API comprising a map abstraction of nodes of the distributed object cache;
distributing the object storing the security information including the one or more sets of security policies from the distributed object cache to at least one second node of the plurality of nodes in the cluster; and
updating locally stored security information including one or more sets of security policies on the at least one second node of the plurality of nodes with the security information from the distributed object cache.

16. The computer-readable memory device of claim 15, wherein storing the security information on the distributed object cache comprises writing the security information to a journal, the journal comprising a plurality of log entries, each log entry comprising information identifying changes made to the security information and a time of the changes.

17. The computer-readable memory device of claim 16, wherein distributing the security information from the distributed object cache comprises providing a notification from at least one of the journal or the API to the at least one second node of the plurality of nodes and wherein updating locally stored security information on the at least one second node of the plurality of nodes with the security information from the distributed object cache is based on the log entries of the journal and a type of the security information.

18. The computer-readable memory device of claim 17, wherein updating locally stored security information on the at least one second node of the plurality of nodes with the security information from the distributed object cache comprises replacing the locally stored security information with updated security information from a database on the distributed object cache in response to determining based on the log entries of the journal that the updated security information from the database is newer than the locally stored security information.

19. The computer-readable memory device of claim 17, wherein updating locally stored security information on the at least one second node of the plurality of nodes with the security information from the distributed object cache comprises replacing the locally stored security information with updated security information from the API in response to determining based on the log entries of the journal that the updated security information from the API is newer than the locally stored security information.

* * * * *

UNITED STATES PATENT AND TRADEMARK OFFICE
CERTIFICATE OF CORRECTION

PATENT NO. : 8,898,728 B2  Page 1 of 1
APPLICATION NO. : 13/241825
DATED : November 25, 2014
INVENTOR(S) : Sreehari et al.

It is certified that error appears in the above-identified patent and that said Letters Patent is hereby corrected as shown below:

On title page, column 1, under Assignee, line 2, delete "Redmond" and insert -- Redwood --, therefor.

Signed and Sealed this
Eleventh Day of August, 2015

Michelle K. Lee
*Director of the United States Patent and Trademark Office*